(12) United States Patent
Muramatsu et al.

(10) Patent No.: US 6,338,402 B1
(45) Date of Patent: Jan. 15, 2002

(54) ONEWAY CLUTCH

(75) Inventors: Kazuhiko Muramatsu, Fukuroi; Hirobumi Shirataki, Shizuoka-ken, both of (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/640,079

(22) Filed: Aug. 17, 2000

(30) Foreign Application Priority Data

Aug. 19, 1999 (JP) .............................. 11-232796

(51) Int. Cl.[7] .............................. F16D 41/00
(52) U.S. Cl. .............................. 192/45
(58) Field of Search .............................. 192/45, 41 R, 192/45.1; 188/82.84

(56) References Cited

U.S. PATENT DOCUMENTS 5,279,400 A * 1/1994 Riggle et al. .................. 192/45
5,738,193 A * 4/1998 Johnston ...................... 192/45

FOREIGN PATENT DOCUMENTS

JP 62-9035 * 1/1987
JP 1-312230 * 12/1989

* cited by examiner

Primary Examiner—Charles A Marmor
Assistant Examiner—Saúl Rodríguez
(74) Attorney, Agent, or Firm—Miles & Stockbridge P.C.

(57) ABSTRACT

A oneway clutch comprises an inner race, an outer race, a plurality of concave cams, each consisting of a trough and an inclined surface, formed on the inner peripheral surface of the outer race, a plurality of grooves formed on the inner peripheral surface of the outer race, a plurality of torque transmitting members interposed between the outer peripheral surface of the inner race and the concave cams, biasing means for biasing these torque transmitting members toward the inclined surface side in the concave cam, block bearings engaged with the grooves and adapted to maintain a gap between the inner race and the outer race, and a retainer attached to the outer race so as to retain the torque transmitting members, the biasing means and the block bearings. Each of the block bearings comprises a latch recess formed on a side surface thereof or a latch hole extended through in the axial direction. The latch recess or a latch protrusion to be fitted in the latch hole.

4 Claims, 6 Drawing Sheets

ONEWAY CLUTCH

This application claims the benefits of Japanese Application No. 11-232796 which is hereby incorporated by reference.

BACKGROUND OF THE INVENTION

1. Field of the Invention

The present invention relates to a oneway clutch to be assembled in an automatic transmission, or the like, of a car, and to the technology for facilitating a conveying work.

2. Related Background Art

Generally, an automatic transmission for a car comprises a planetary gear transmission mechanism capable of 3 to 5 speed changes, in addition to a torque converter serving as a fluid coupling, so as to conduct the speed change by properly fixing or releasing the constituent elements of the planetary gear transmission mechanism (a sun gear, a planetary gear, etc.) with frictional engagement means such as a clutch or a brake. As the frictional engagement means to be assembled in the automatic transmission, a wet-type multi-disc type means which comprises friction plates and separator plates alternately provided therein is employed, with the exception of certain band-type brakes. For the pressure engagement (frictional engagement) of the both plates, pressure oil from a gear change control oil pressure circuit is employed. Some of such frictional engagement means incorporate a oneway clutch therein, so as to freely rotate a gear shaft, or the like, in one direction, thereby realizing easier gear change control.

FIG. 6 is a front view for showing a conventional oneway clutch to be assembled in the frictional engagement means. FIG. 7 is a view for showing the portion D in FIG. 6 in an enlarged manner, and FIG. 8 is a cross-sectional view taken along the line E—E in FIG. 7.

This oneway clutch 1 comprises a cylindrical inner race (an output shaft, an input shaft, or the like, of the automatic transmission) 3, an annular outer race 5 provided to be coaxial and rotatable relatively with the inner race 3, a large number of rollers 7 interposed between the inner race 3 and the outer race 5 to serve as torque transmitting members, etc. On the inner peripheral surface of the outer race 5, there are formed a plurality of concave cams 13 formed along the circumferential direction and each comprising a trough 9 and an inclined surface 11, and a plurality of grooves 15 formed along the axial direction. Each of the rollers 7 is provided between the outer peripheral surface of the inner race 3 and the concave cam 13, and is biased to the inclined surface 11 inside the concave cam by means of a coil spring 17. The outer end portion 21 of each of the block bearings 19 made of oil impregnated sintered alloy is engaged with each groove 15, and a gap between the inner race 3 and the outer race 5 is maintained by these block bearings 19. In the drawings, a reference numeral 22 denotes a latch nail which is formed on the outer periphery of the outer race 5, to be engaged with a latch groove formed on the inner peripheral surface of an unrepresented gear element.

Attached to the outer race 5 is a retainer 23 which is made of synthetic resin and comprises a first annular flange 25 having a large diameter and a second annular flange 27 having a small diameter coupled to each other by means of first to third columns 29, 31 and 33. This retainer 23 is adapted to prevent separation or falling off of the rollers 7, the coil springs 17 or the block bearings 19. For example, the roller 7 and the coil spring 17 are interposed and retained between the columns 29, 31 and 33, while the block bearing 19 is between the second column 31 and the third column 33. In the drawings, a referential numeral 35 denotes a lip portion formed on the second column 31 and is engaged with a protrusion 37 which is formed on the outer end side of the block bearing 19.

In the conventional oneway clutch, the block bearing often falls off when it is being conveyed as a sub-assembly, so that a loss in time may be generated because of a re-assembling in an assembly line, etc., of the automatic transmission.

More specifically, in the aforementioned oneway clutch 1, since the inner race 3, which is a constituent element, is the output shaft, or the input shaft, or the like, of the automatic transmission, the inner race 3 naturally does not exist in a sub-assembly 39 prior to the assembly of the automatic transmission. Accordingly, if any impact is given in the course of conveyance of the sub-assembly 39, the lip portion 35 of the second column 31 is elastically deformed, whereby the block bearing 19 falls off comparatively easily. In this case, an assembler is supposed to pick up the fallen-off block bearing 19 to be assembled again, which work, however, is an irregular work that may cause deceleration of the conveyer speed of the assembly line. Also, if the fallen-off block bearing 19 rolls into a lower part of the conveyer, or the like, the assembly line may be suspended under certain circumstances.

SUMMARY OF THE INVENTION

Taking the aforementioned circumstances into consideration, an object of the present invention is to provide a oneway clutch which allows a retainer to securely retain a block bearing so as to enhance the efficiency in the assembling work.

In order to solve the above problems, according to the present invention, there is proposed a oneway clutch which comprises an inner race, an outer race provided coaxial and relatively rotatable with the inner race, a plurality of concave cams, each consisting of a trough and an inclined surface, formed on the inner peripheral surface of the outer race along the circumferential direction thereof, a plurality of grooves formed on the inner peripheral surface of the outer race along the axial direction thereof, a plurality of torque transmitting members interposed between the outer peripheral surface of the inner race and the concave cams, biasing means for biasing these torque transmitting members toward the inclined surface side in the concave cam, block bearings to be engaged with the grooves and adapted to maintain a gap between the inner race and the outer race, and a retainer attached to the outer race so as to retain the torque transmitting members, the biasing means and the block bearings, and wherein the torque transmitting members roll from the trough side to the inclined surface side only at the time of one directional relative rotation of the inner race and the outer race so as to conduct a torque transmission, and each of the block bearings comprises a latch recess formed on a side surface thereof or a latch hole extended through in the axial direction, while the retainer is provided with the latch recess or a latch protrusion to be fitted in the latch hole.

According to this invention, when the block bearing is thrust into a predetermined part of the retainer, the retainer is elastically deformed and the latch protrusion is fitted in the latch recess or the latch hole of the block bearing, so that the block bearing does not easily fall off.

Also, according to the invention, it is preferable, in the oneway clutch set forth above, that the retainer is made of synthetic resin. According to this feature, the retainer and the oneway clutch may be light-weighted, and at the same time, the retainer may be easily deformable elastically when the block bearing is assembled.

Also, according to the invention, it is preferable, in the oneway clutch set forth above, that the latch protrusion is adapted to bias the block bearings to the inner peripheral surface of the outer race. According to this feature, the block bearing is not moved to the inner race side in the course of conveyance, so that the inner race and the block bearing do not interfere with each other during the assembly.

DESCRIPTION OF THE PREFERRED EMBODIMENTS

Figure 1:
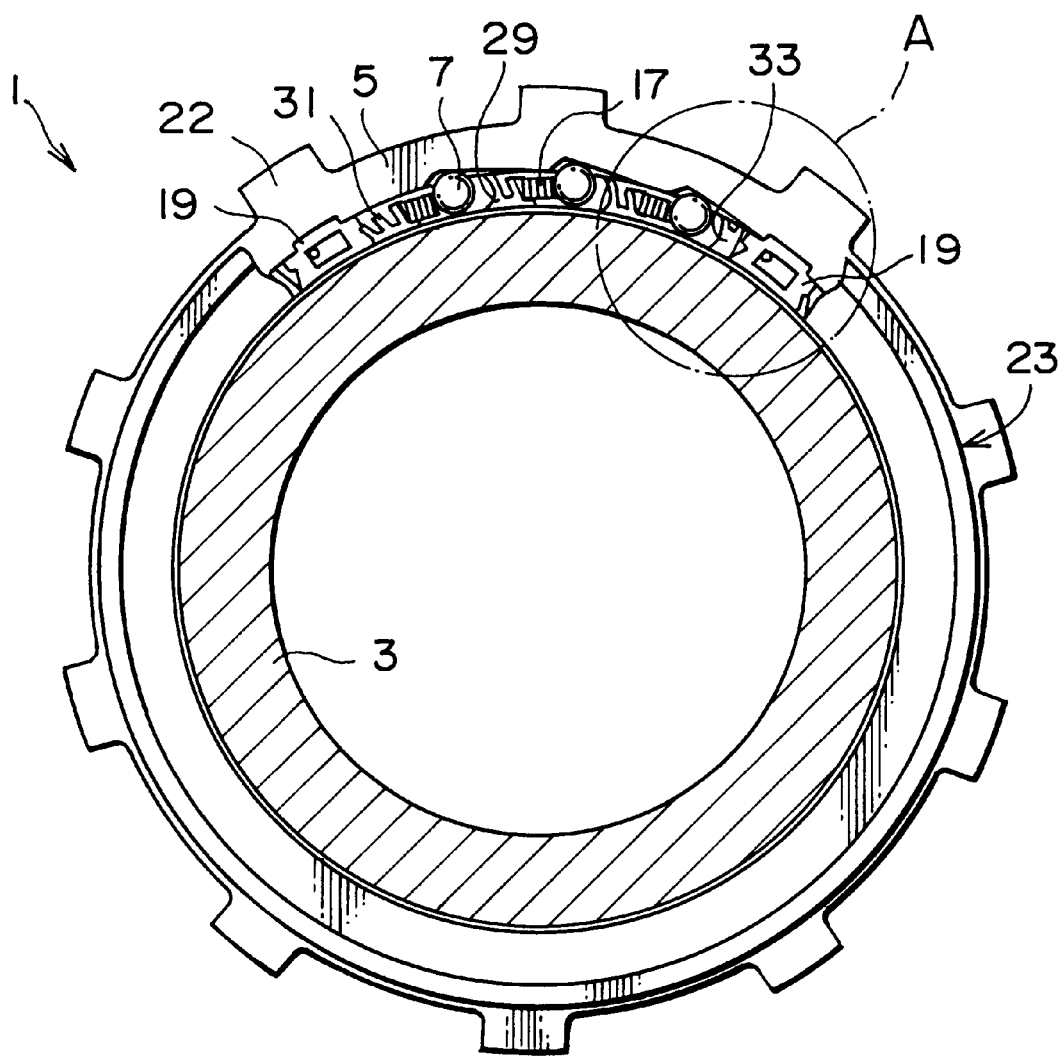
FIG. 1 is a front view for showing an embodiment of a oneway clutch according to the present invention.
Figure 2:
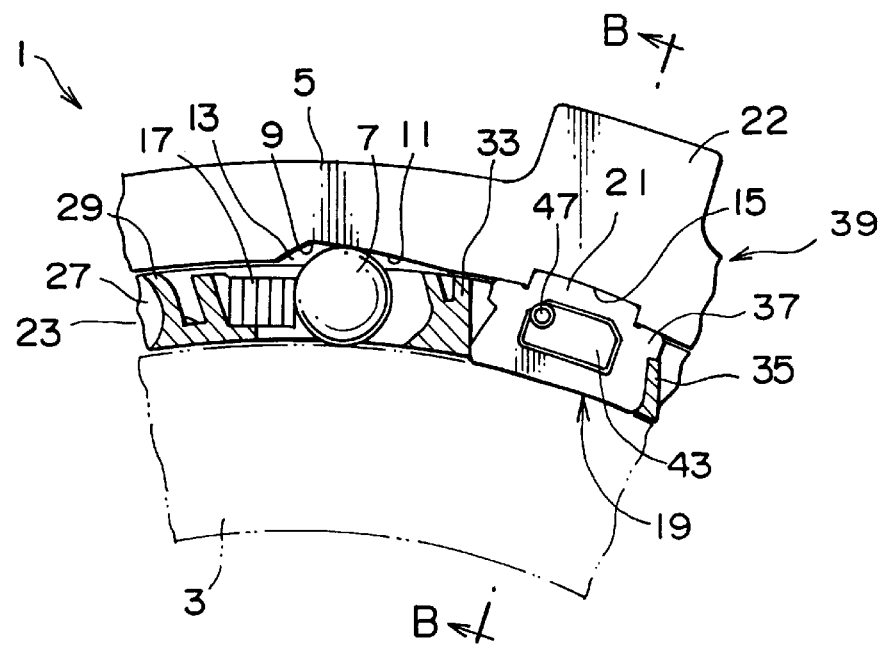
FIG. 2 is a view for showing the portion A in FIG. 1 in an enlarge manner.
Figure 3:
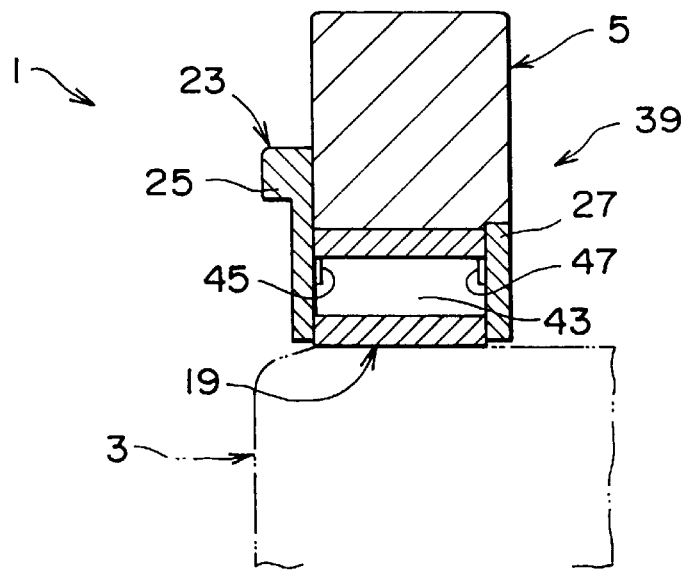
FIG. 3 is a cross-sectional view taking along the line B—B in FIG. 2.

The present invention will be fully described below with reference to the drawings. FIG. 1 is a front view for showing an embodiment of a oneway clutch according to the present invention, FIG. 2 is a view for showing the portion B in FIG. 1 in an enlarged manner, and FIG. 3 is a cross-sectional view taken along the line B—B in FIG. 2. Note that the oneway clutch in this embodiment is assembled in frictional engagement means of an automatic transmission for a car, and the entire structure thereof is the same as that of the conventional oneway clutch described above.

The oneway clutch 1 comprises a cylindrical inner race 3, an annular outer race 5 provided to be coaxial and rotatable relatively with the inner race 3, a large number of rollers 7 interposed between the inner race 3 and the outer race 5 to serve as torque transmitting members, etc. The inner peripheral surface of the outer race 5 is formed with a plurality of concave cams 13 formed along the circumferential direction, and each comprising a trough 9 and an inclined surface 11, and a plurality of grooves 15 formed along the axial direction. Each of the rollers 7 is provided between the outer peripheral surface of the inner race 3 and the concave cam 13, and is biased to the inclined surface 11 inside the concave cam by means of a coil spring 17. The outer end portion 21 of the block bearing 19 made of oil impregnated sintered alloy is engaged with each groove 15, and a gap between the inner race 3 and the outer race 5 is maintained by these block bearings 19. In the drawings, a reference numeral 22 denotes a latch nail which is formed on the outer periphery of the outer race 5, to be engaged with a latch groove which is formed on the inner peripheral surface of an unrepresented gear element.

Figure 4:
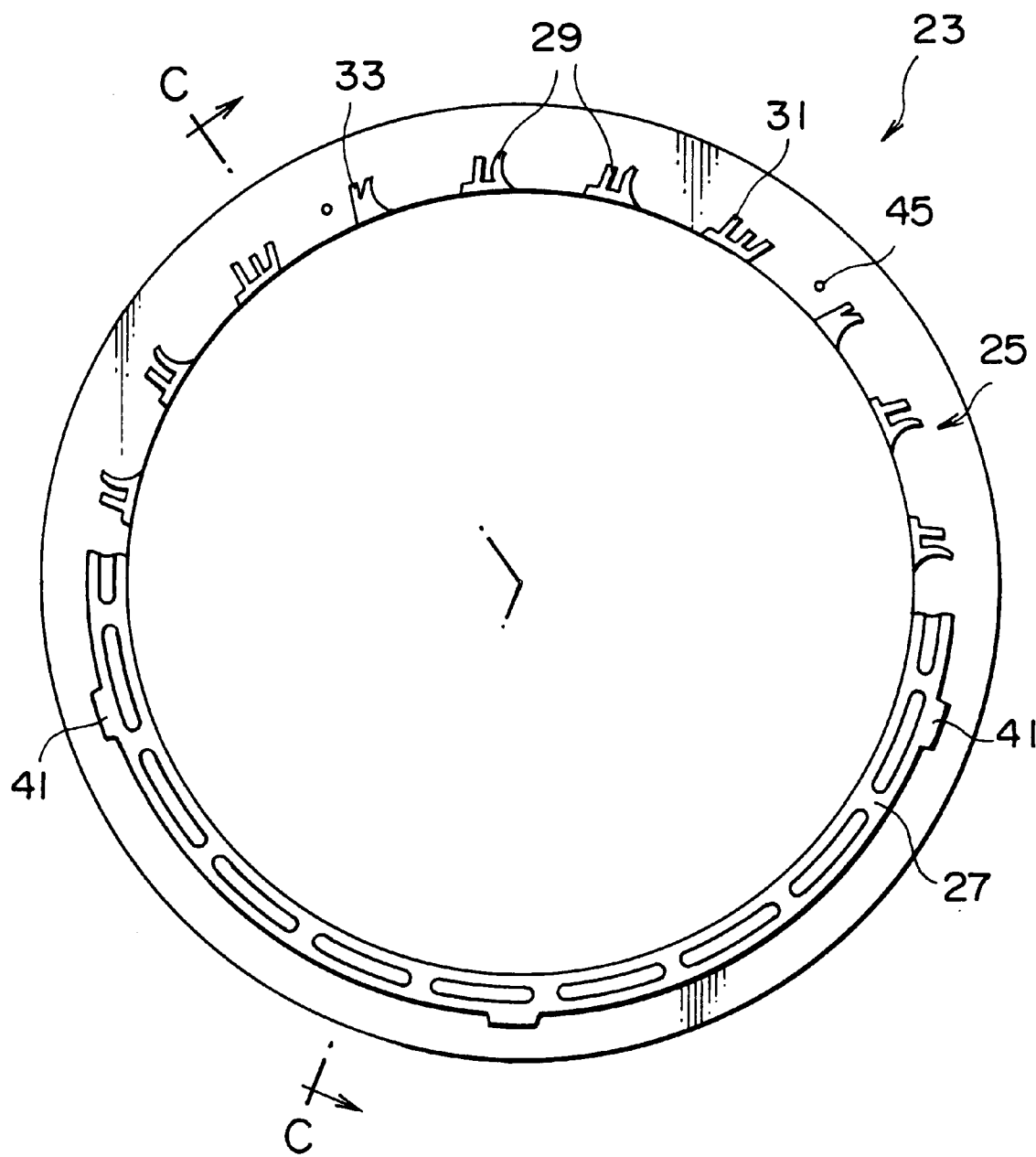
FIG. 4 is a front view of a retainer.
Figure 5:
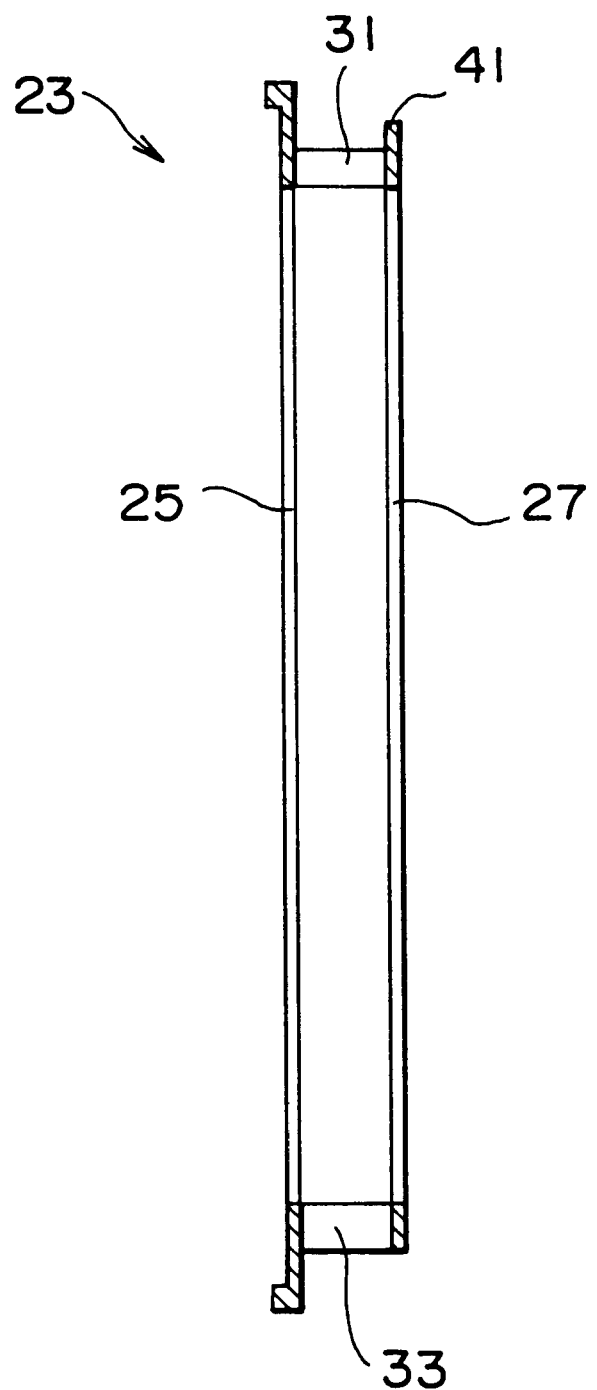
FIG. 5 is a cross-sectional view taking along the line C—C in FIG. 4.
Figure 6:
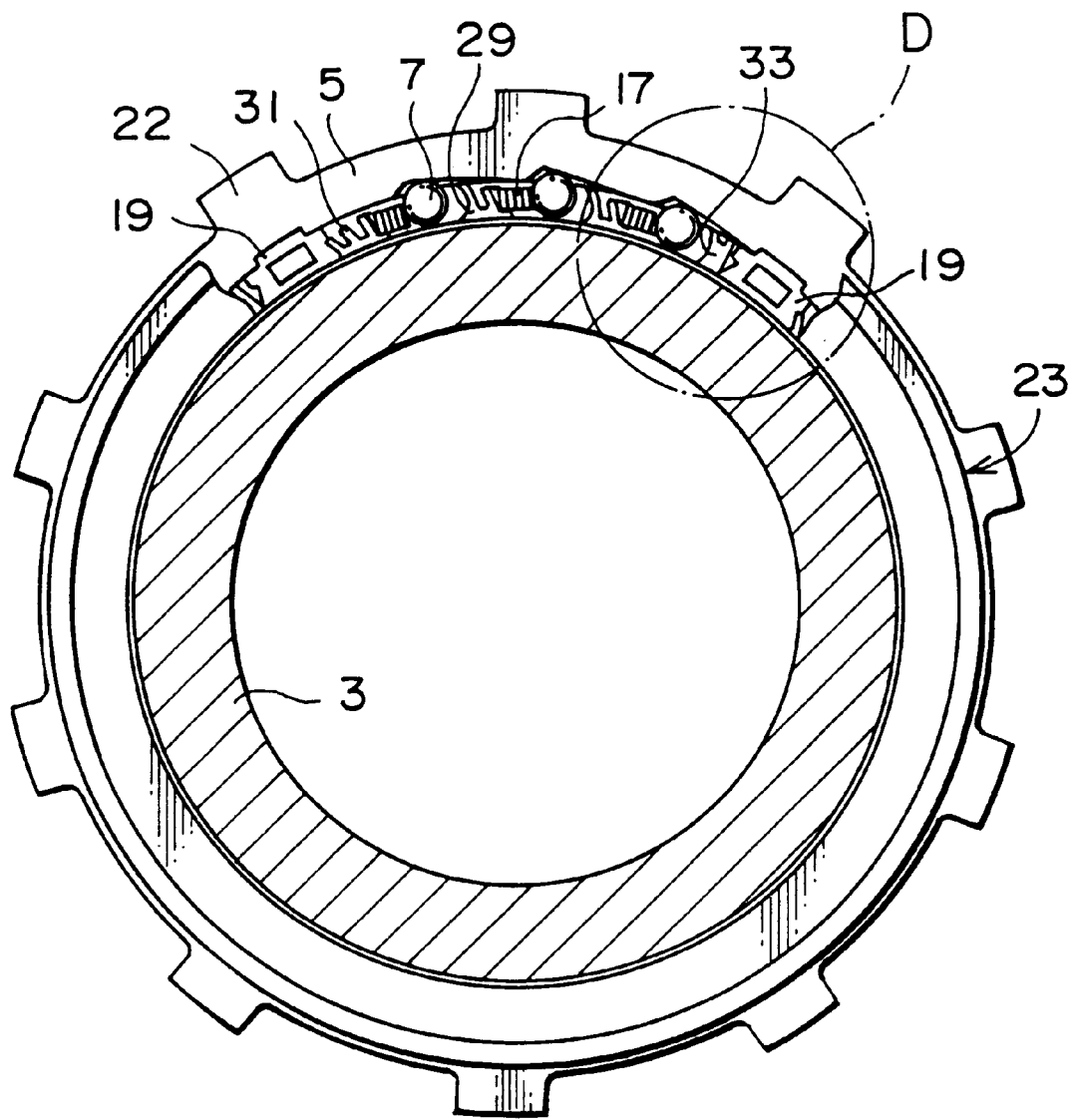
FIG. 6 is a front view for showing a oneway clutch according to the prior art.
Figure 7:
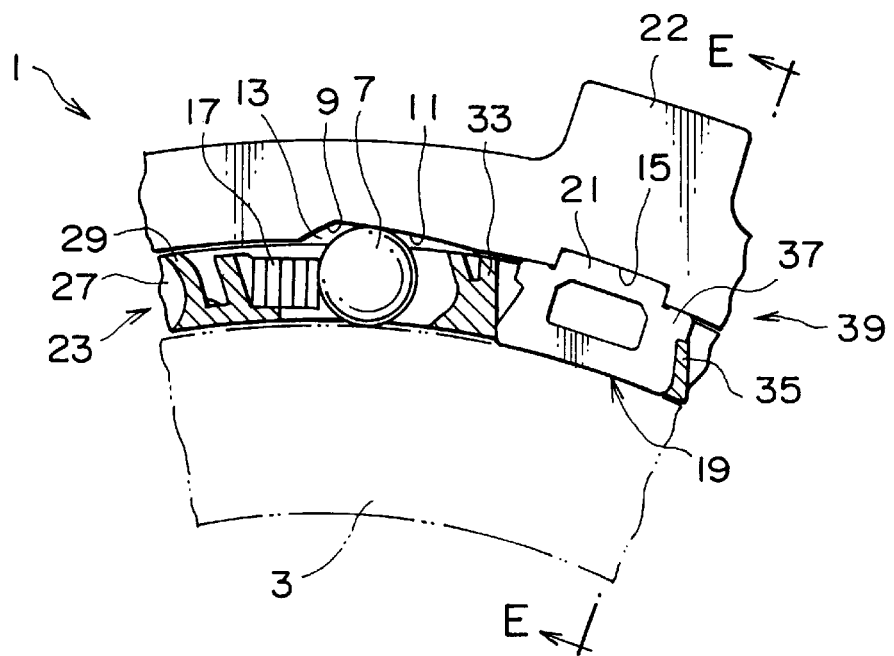
FIG. 7 is a view for showing the portion D in FIG. 6 in an enlarge manner.
Figure 8:
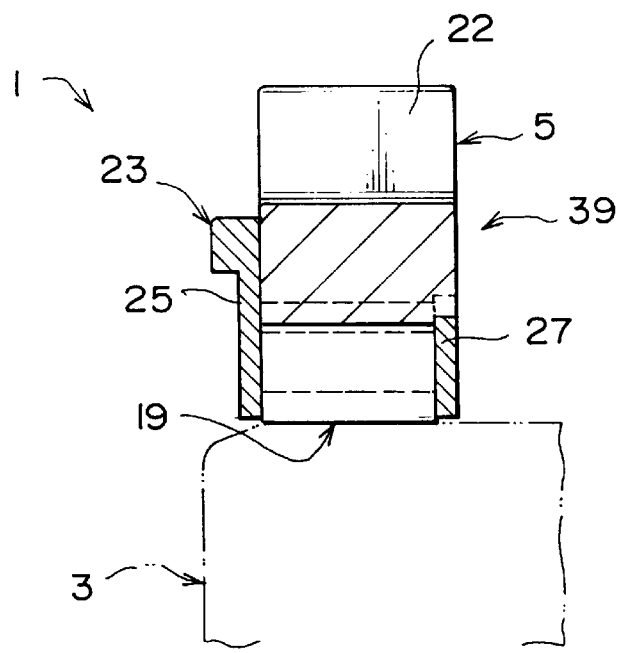
FIG. 8 is a cross-sectional view taking along the line E—E in FIG. 7.

A retainer 23 which is made of synthetic resin and has substantially the same form as that of the conventional oneway clutch is attached to the outer race 5 of the present embodiment. This retainer 23 is adapted to prevent separation or falling off of the rollers 7, the coil springs 17 or the block bearings 19. The retainer 23 is integrally comprised, as shown in FIG. 4 (the front view) and FIG. 5 (the cross-sectional view taken along the line C—C in FIG. 4), of a first annular flange 25 having a large diameter and a second annular flange 27 having a small diameter coupled to each other by means of first to third columns 29, 31 and 33, so that the roller 7 and the coil spring 17 are interposed and retained between the columns 29, 31 and 33, while the block bearing 19 is between the second column 31 and the third column 33. In FIG. 2, a referential numeral 35 denotes a lip portion formed on the second column 31 and is engaged with a protrusion 37 which is formed on the outer end side of the block bearing 19. Note that the second annular flange 27 is formed to have the outer diameter a little larger than the inner diameter of the outer race 5, and to have a rectangular protrusion 41 corresponding to the groove 15 of the outer race 5.

In case of the present embodiment, the block bearing 19 is provided with a through hole 43 in a substantially rectangular form along the axial direction of the oneway clutch 1. Meanwhile, on the inner side surfaces of the first and second annular flanges 25 and 27 of the retainer 23, there are formed latch protrusions 45 and 47 at the positions to fit in the outer ends of the through hole 43 of the block bearing 19.

In the present embodiment, a sub-assembly 39 of the oneway clutch 1 is assembled in the following process. The assembler first attaches the rollers 7 and the coil springs 17 to predetermined positions of the retainer 23, then, in a state that the rectangular protrusions 41 are aligned with the grooves 15, causes the rollers 7 and the coil springs 17 to fit in the outer race 5 from the second annular flange 27 side.

Next, the assembler squeezes the block bearing 19 into the retainer 23 through a gap between the second column 31 and the third column 33, and causes the outer end portion 21 thereof to fit in the groove 15, whereupon the lip portion 35 of the second column 31 latches the protrusion 37 of the block bearing 19 in the same manner as in the conventional device. In the present embodiment, the latch protrusions 45 and 47 of the first and second annular flanges 25 and 27 are also caused to fit in the outer ends of the through hole 43 of the block bearing 19. Then, the block bearing 19 is securely retained by the retainer 23, and at the same time, is strongly pressed on the inner peripheral surface of the outer race 5.

In the present embodiment, with such structure employed, even when an impact is given in the state of the subassembly 39, the block bearing 19 does not easily fall off and, in addition, is not protruded from the inner peripheral end of the retainer 23 to the inner race 3 side in an amount exceeding a predetermined value. Thus, the assembling work can be conducted very smoothly.

A specific description of the embodiment is as described above. However, the present invention is not limited to this. For example, though the above embodiment employs a roller as the torque transmitting member, a steel ball, or the like, may be used instead of this roller. Moreover, a recess may be formed on a side surface of the block bearing, instead of the through hole, or a single latch protrusion may be formed on the retainer for each block bearing. Further, the specific forms, etc., of the retainer and the inner and outer races are not limited to those in the aforementioned embodiment, but may be properly changed for reasons of designing and the like.

As clearly seen from the above description, the oneway clutch according to the present invention comprises an inner race, an outer race provided coaxial and relatively rotatable with the inner race, a plurality of concave cams, each consisting of a trough and an inclined surface, formed on the inner peripheral surface of the outer race along the circumferential direction thereof, a plurality of grooves formed on the inner peripheral surface of the outer race along the axial direction thereof, a plurality of torque transmitting members interposed between the outer peripheral surface of the inner race and the concave cams, biasing means for biasing these torque transmitting members toward the inclined surface inside the concave cam, block bearings to be engaged with the grooves and adapted to maintain a gap between the inner race and the outer race, and a retainer attached to the outer race to retain the torque transmitting members, the biasing means and the block bearings. In this structure, the torque transmitting members roll from the trough side to the inclined surface side only at the time of one-directional relative rotation of the inner race and the outer race so as to conduct a torque transmission, and each of the block bearings comprises a latch recess formed on a side surface thereof or a latch hole extended through in the axial direction, while the retainer is provided with the latch recess or a latch protrusion to be fitted in the latch hole. Thus, when the block bearing is squeezed into a predetermined part of the retainer, the retainer is elastically deformed to cause the latch protrusion to be fitted in the latch recess or the latch hole of the block bearing, so that the block bearing does not easily fall off, thereby allowing the assembling work to be conducted smoothly.

Also, according to the invention, in the oneway clutch, the retainer may be made of synthetic resin, so that the retainer and the oneway clutch become lightweighted, and at the same time, the retainer can be easily deformed elastically when the block bearing is squeezed, thereby enhancing the assembling workability.

Also, according to the invention, in the oneway clutch, the latch protrusion may be adapted to bias the block bearing to the inner peripheral surface of the outer race, so that the block bearing is not moved to the inner race side at the time of conveyance and the inner race and the block bearing do not interfere with each other in the course of assembly, thereby allowing the assembling work to be conducted smoothly.

What is claimed is:

1. A oneway clutch comprising:

an inner race;

an outer race provided coaxial and relatively rotatable with said inner race;

a plurality of concave cams, each consisting of a trough and an inclined surface, formed on the inner peripheral surface of said outer race along the circumferential direction thereof;

a plurality of grooves formed on the inner peripheral surface of said outer race along the axial direction thereof;

a plurality of torque transmitting members interposed between the outer peripheral surface of said inner race and said concave cams;

biasing means for biasing these torque transmitting members toward said inclined surface side in said concave cams;

block bearings to be engaged with said grooves and adapted to maintain a gap between said inner race and said outer race; and a retainer attached to said outer race to retain said torque transmitting members, said biasing means and said block bearings, wherein said torque transmitting members roll from said trough side to said inclined surface side only at the time of one-directional relative rotation of said inner race and said outer race so as to conduct a torque transmission between said inner race and said outer race, and each of said block bearings comprises a latch recess formed on a side surface thereof or a latch hole extended through in the axial direction, while said retainer is provided with said latch recess or a latch protrusion to be fitted in said latch hole.

2. A oneway clutch according to claim 1, wherein said retainer is made of synthetic resin.

3. A oneway clutch according to claim 1, wherein said latch protrusion is adapted to bias said block bearings to the inner peripheral surface of said outer race.

4. A oneway clutch according to claim 2, wherein said latch protrusion is adapted to bias said block bearings to the inner peripheral surface of said outer race.

* * * * *